(12) United States Patent
Hamlin et al.

(10) Patent No.: US 10,821,882 B2
(45) Date of Patent: Nov. 3, 2020

(54) HEADLAMP ASSEMBLY WITH AUTODIMMING FUNCTIONALITY

(71) Applicant: Gentex Corporation, Zeeland, MI (US)

(72) Inventors: Bradley R. Hamlin, Allendale, MI (US); Eric S. Lundy, Grand Rapids, MI (US); Danny L. Minikey, Jr., Fenwick, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 16/171,426

(22) Filed: Oct. 26, 2018

(65) Prior Publication Data

US 2019/0126813 A1 May 2, 2019

Related U.S. Application Data

(60) Provisional application No. 62/577,876, filed on Oct. 27, 2017.

(51) Int. Cl.
| | | |
|---|---|---|
| *F21S 41/40* | (2018.01) | |
| *B60Q 1/14* | (2006.01) | |
| *F21S 41/43* | (2018.01) | |
| *F21S 41/20* | (2018.01) | |

(52) U.S. Cl.
CPC .......... *B60Q 1/1423* (2013.01); *F21S 41/285* (2018.01); *F21S 41/40* (2018.01); *F21S 41/43* (2018.01); *F21S 41/435* (2018.01); *B60Q 2300/42* (2013.01); *B60Q 2300/43* (2013.01)

(58) Field of Classification Search
CPC ........ B60Q 1/1423; F21S 41/40; F21S 41/43; F21S 41/435
USPC .......................................... 362/466
See application file for complete search history.

(56) References Cited

U.S. PATENT DOCUMENTS

| | | | |
|---|---|---|---|
| 6,049,171 A * | 4/2000 | Stam | B60Q 1/085 250/208.1 |
| 6,728,393 B2 | 4/2004 | Stam et al. | |
| 2008/0084165 A1* | 4/2008 | Otsuka | B60Q 1/0023 315/82 |
| 2011/0074956 A1* | 3/2011 | Faber | G02B 23/12 348/148 |
| 2020/0017164 A1* | 1/2020 | Saeki | B62M 6/50 |

FOREIGN PATENT DOCUMENTS

| | | | |
|---|---|---|---|
| CN | 205468750 U | 8/2016 | |
| EP | 2626243 A1 * | 8/2013 | .......... B60Q 1/0023 |
| RU | 2446963 C1 | 4/2012 | |

* cited by examiner

*Primary Examiner* — Christopher M Raabe
(74) *Attorney, Agent, or Firm* — Price Heneveld LLP; Bradley D. Johnson

(57) ABSTRACT

A headlamp assembly includes a housing. A headlamp is disposed within the housing. An image sensor is disposed within the housing and is configured to detect a light source. A controller is operably coupled to the image sensor and the headlamp. The controller is operable to control the headlamp in response to the light source detected by the image sensor.

16 Claims, 12 Drawing Sheets

HEADLAMP ASSEMBLY WITH AUTODIMMING FUNCTIONALITY

CROSS-REFERENCE TO RELATED APPLICATION

This application claims priority to and the benefit under 35 U.S.C. § 119(e) of U.S. Provisional Application No. 62/577,876, filed on Oct. 27, 2017, entitled "HEADLAMP ASSEMBLY WITH AUTODIMMING FUNCTIONALITY," the disclosure of which is hereby incorporated herein by reference in its entirety.

FIELD OF THE DISCLOSURE

The present disclosure generally relates to a headlamp assembly, and more particularly to a headlamp assembly having autodimming functionality.

SUMMARY OF THE DISCLOSURE

According to one aspect of the present disclosure, a headlamp assembly includes a housing. A headlamp is disposed within the housing. An image sensor is disposed within the housing and is configured to detect a light source. A controller is operably coupled to the image sensor and the headlamp. The controller is operable to control the headlamp in response to the light source detected by the image sensor.

According to another aspect of the present disclosure, a vehicle system includes a housing disposed at a forward portion of a vehicle. A headlamp is disposed within the housing. An image sensor is disposed within the housing and is configured to detect a light source. The vehicle system also includes an ambient light sensor. A controller is operably coupled to the image sensor, the ambient light sensor, and the headlamp. The controller is operable to control the headlamp in response to the light source detected by the image sensor.

According to yet another aspect of the present disclosure, a method of automatically controlling vehicle headlamps in a system includes an image sensor disposed proximate a headlamp within a headlamp housing. The image sensor is operably coupled with a controller that generates headlamp control signals. The method also includes detecting a light source by the image sensor. The headlamp control signal is selectively generated in response to the detected light source. An activation state of the headlamp is changed in response to the headlamp control signal.

According to still another aspect of the present disclosure, a vehicle system includes a housing disposed at a front portion of a vehicle and includes a forward opening. A headlamp is disposed within the housing. A headlamp lens extends over the forward opening. An image sensor is disposed within the housing and is configured to detect a light source. The vehicle system also includes an ambient light sensor. A controller operably coupled to the image sensor, the ambient light sensor, and the headlamp. The controller is operable to control the headlamp in response to the light source detected by the image sensor. A baffle is proximate the image sensor. The baffle may be configured to isolate the image sensor from light emitted by the headlamp. The baffle may extend from the housing forward toward the headlamp lens of the housing or may extend from the headlamp lens rearward to the housing. The baffle may include a protrusion that is internal to the headlamp lens.

These and other features, advantages, and objects of the present disclosure will be further understood and appreciated by those skilled in the art by reference to the following specification, claims, and appended drawings.

DETAILED DESCRIPTION

Figure 1A:
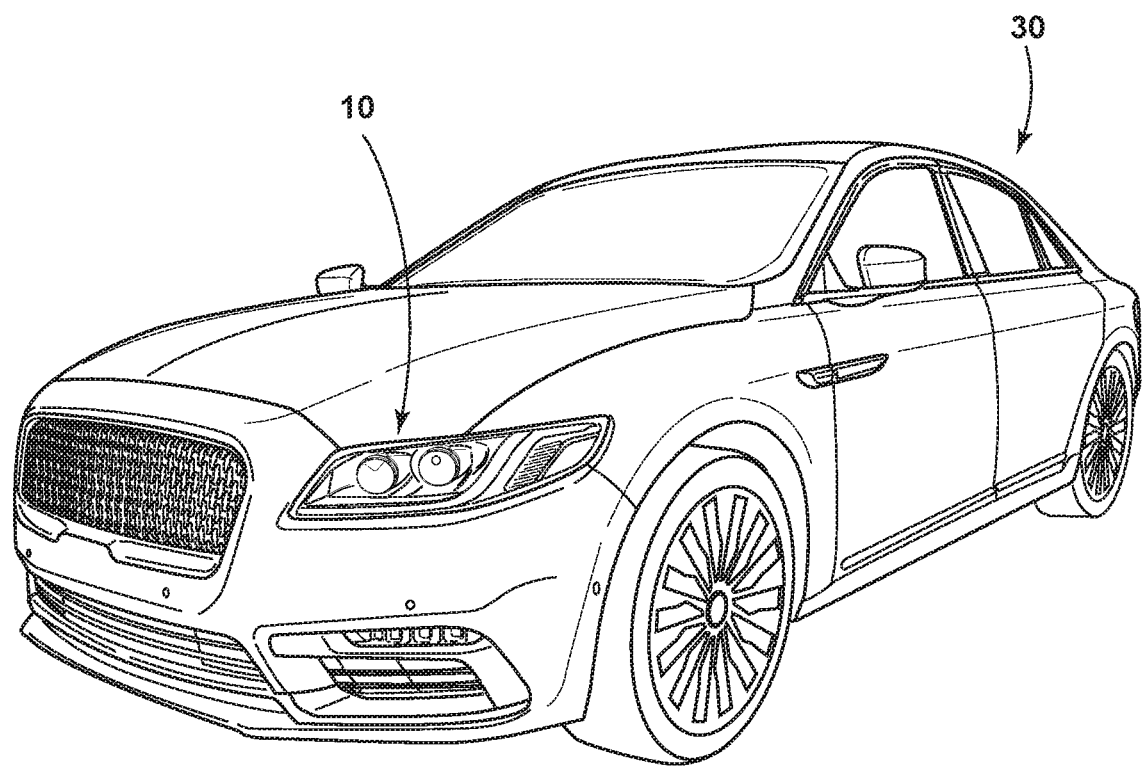
FIG. 1A is a front perspective view of a headlamp assembly of the present disclosure disposed in a vehicle.

The present illustrated embodiments reside primarily in combinations of method steps and apparatus components related to a headlamp assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 2:
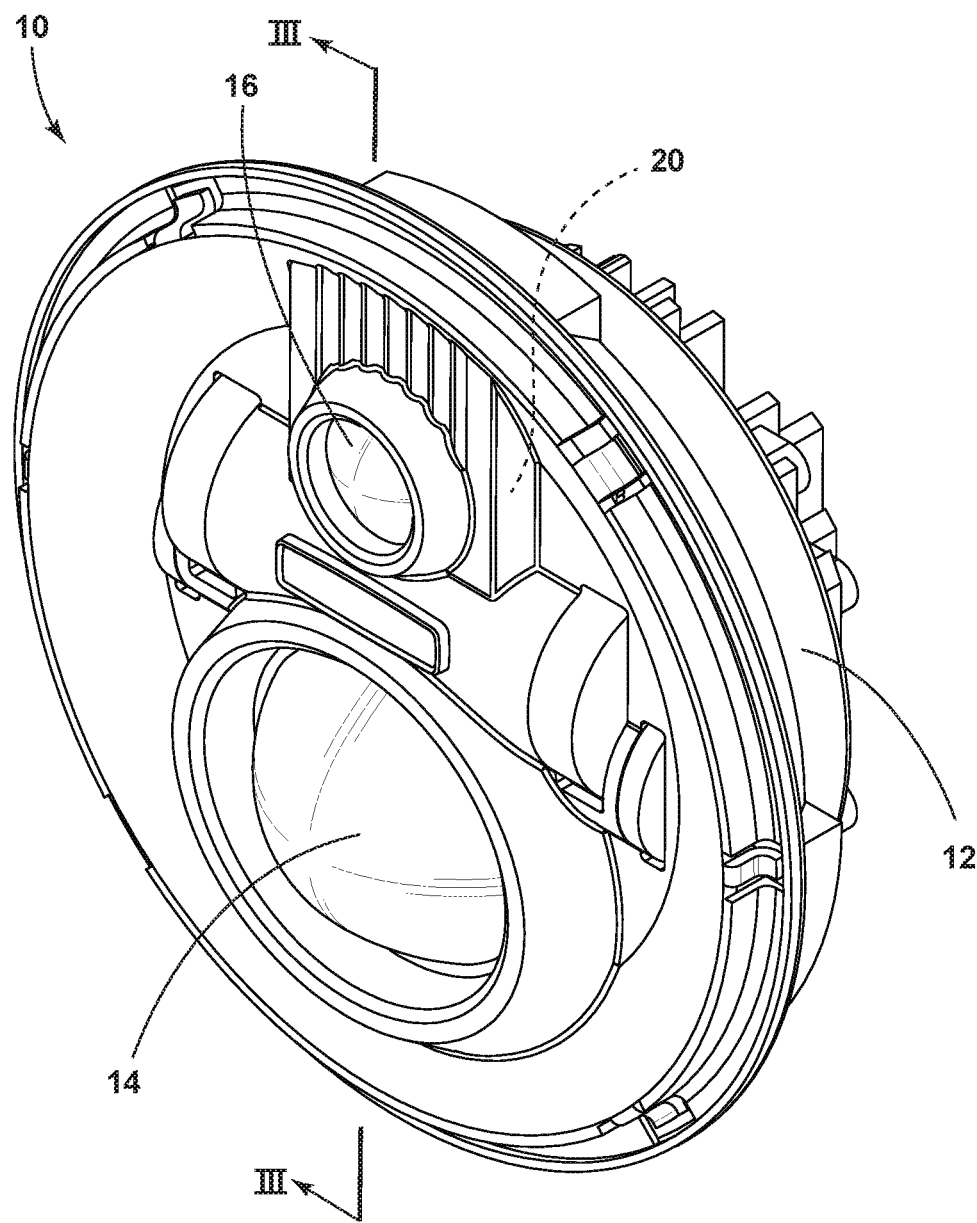
FIG. 2 is a front perspective view of a headlamp assembly of the present disclosure with a headlamp lens removed.

For purposes of description herein, the terms "upper," "lower," "right," "left," "rear," "front," "vertical," "horizontal," and derivatives thereof, shall relate to the disclosure as oriented in FIG. 2. Unless stated otherwise, the term "front" shall refer to the surface of the device closer to an intended viewer of the device, and the term "rear" shall refer to the surface of the device further from the intended viewer of the device. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

Referring to FIGS. 1A-11, reference numeral 10 generally designates a headlamp assembly that includes a housing 12 and a headlamp 14 disposed within the housing 12. An image sensor 16 is disposed within the housing 12 and is configured to detect a light source 18. A controller 20 is operably coupled to the image sensor 16 and the headlamp 14. The controller 20 is operable to control the headlamp 14 in response to the light source 18 that is detected by the image sensor 16.

Figure 1B:
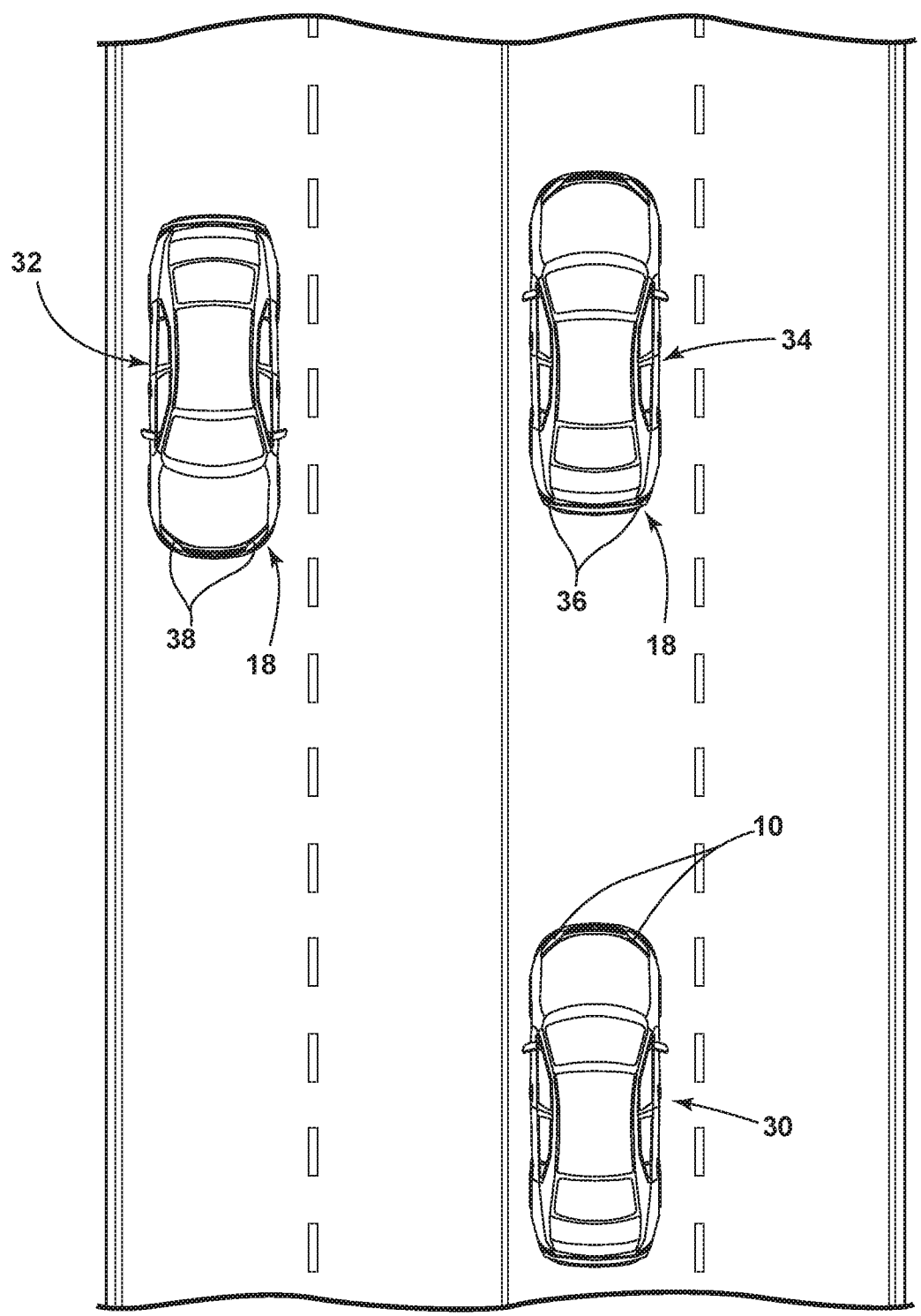
FIG. 1B is a top plan view of a vehicle with a headlamp assembly of the present disclosure following a preceding vehicle and moving toward an oncoming vehicle.

With reference now to FIGS. 1A and 1B, the headlamp assembly 10, as set forth herein, is generally configured for installation into an attached vehicle 30. For purposes of this disclosure, the attached vehicle 30 is the vehicle within which the headlamp assembly 10 is attached. The vehicle 30 is configured to utilize a high beam function of the headlamp assembly 10 when additional lighting is needed forward of the vehicle 30. The high beam function increases the light output of the headlamp 14, which allows for additional viewing and a brighter light illuminating the path forward of the vehicle 30. However, in some instances, it is not desirable to have the high beams activated. In these instances, it may be desirable for the high beams to be deactivated (activating the low beam function of the headlamps 14). Activation and deactivation of the high beam function of the headlamps 14 can become tedious and can be forgotten by the user. This can result in the high beams being accidentally left activated, or the high beams being left off when desired. For example, on accident, the high beams could be left activated when the vehicle 30 is traveling, resulting in a distracting light source to an oncoming vehicle 32 and to a preceding vehicle 34 traveling ahead of the attached vehicle 30. Accordingly, utilization of an autodimming feature that senses taillights 36 of the preceding vehicle 34 and headlights 38 of the oncoming vehicle 32, and which controls the activation of the headlamps 14 of the attached vehicle 30, as well as activation of the high beam and low beam functions of the headlamps 14, is beneficial.

Figure 3:
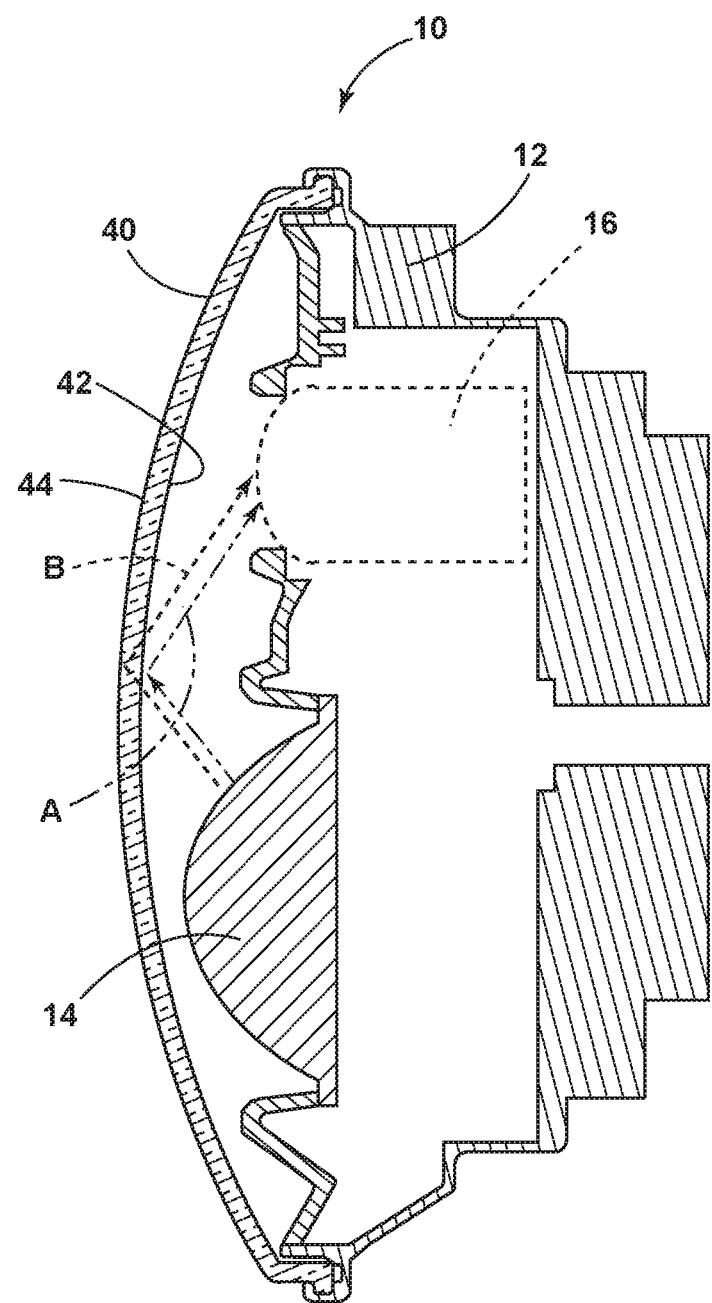
FIG. 3 is a side elevational cross-sectional view of the headlamp assembly of FIG. 2 with the headlamp lens installed.

With reference now to FIGS. 2 and 3, the illustrated headlamp assembly 10 is configured to automatically transition the headlamp 14 from a high beam condition to a low beam condition based on image data received by the image sensor 16 within the housing 12 of the headlamp assembly 10. As illustrated, the headlamp assembly 10 includes the headlamp 14, which is disposed below the image sensor 16. Notably, the image sensor 16 may be located anywhere within the housing 12 and is not limited to a position above the headlamp 14. The image sensor 16 is configured to receive image data through a headlamp lens 40 of the headlamp assembly 10. At the same time, the headlamp 14 projects light forward through the headlamp lens 40. However, light may be reflected by an inside surface 42 or an outside surface 44 back toward the image sensor 16 along lines A and B, respectively. In an effort to overcome this problem, it is generally contemplated that the controller operably coupled with the imager may utilize an algorithm that functions to discern between the headlamp 14 within the headlamp assembly 10 of the attached vehicle 30 and the headlights 38 of the oncoming vehicle 32 or the taillights 36 of the preceding vehicle 34. Accordingly, the controller 20 operates to control the headlamp 14 in response to the light source 18 forward of the headlamp assembly 10 and not in response to operation of the headlamp 14 within the headlamp assembly 10 of the attached vehicle 30.

Figure 4:
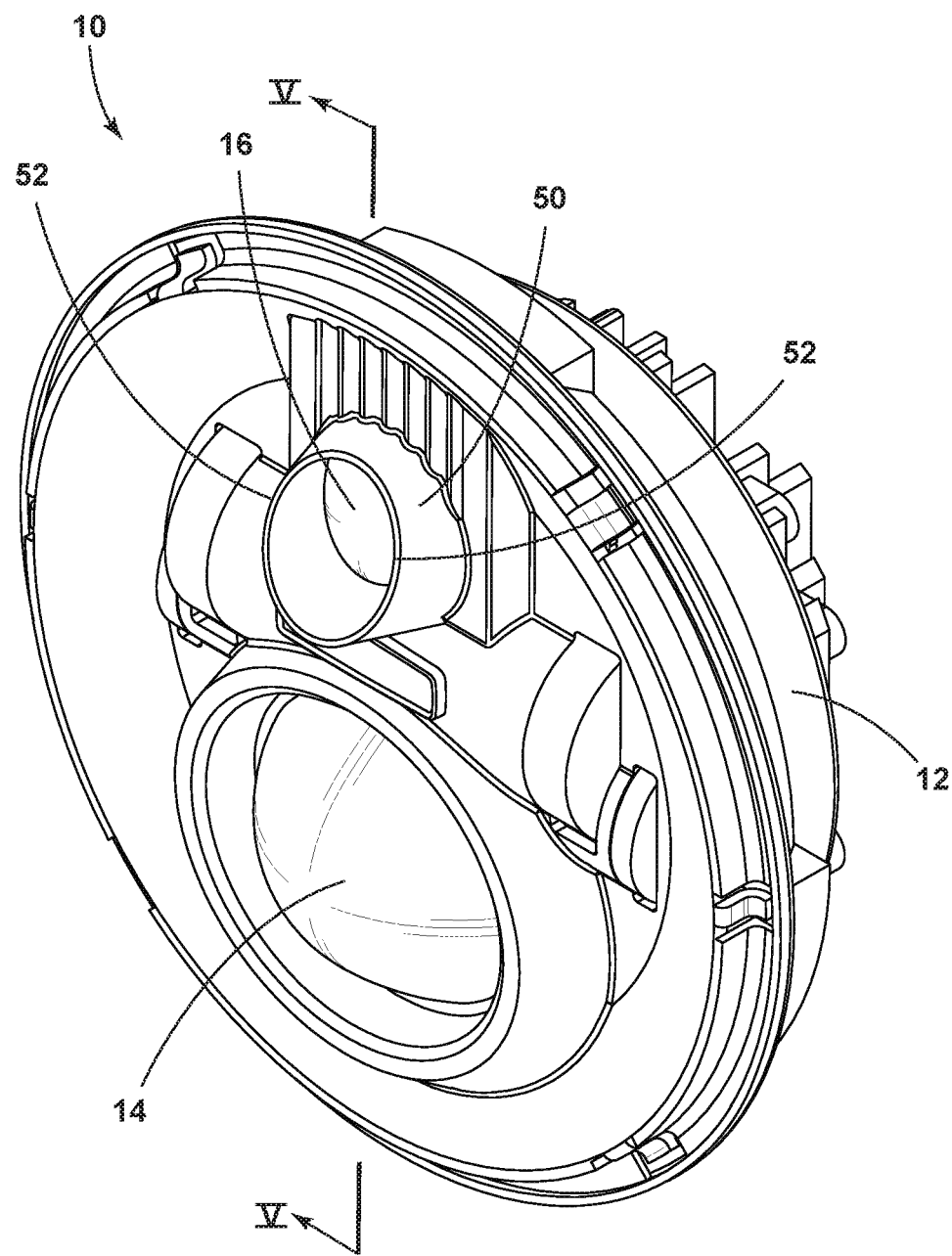
FIG. 4 is a front perspective view of a headlamp assembly of the present disclosure with the headlamp lens removed.
Figure 5:
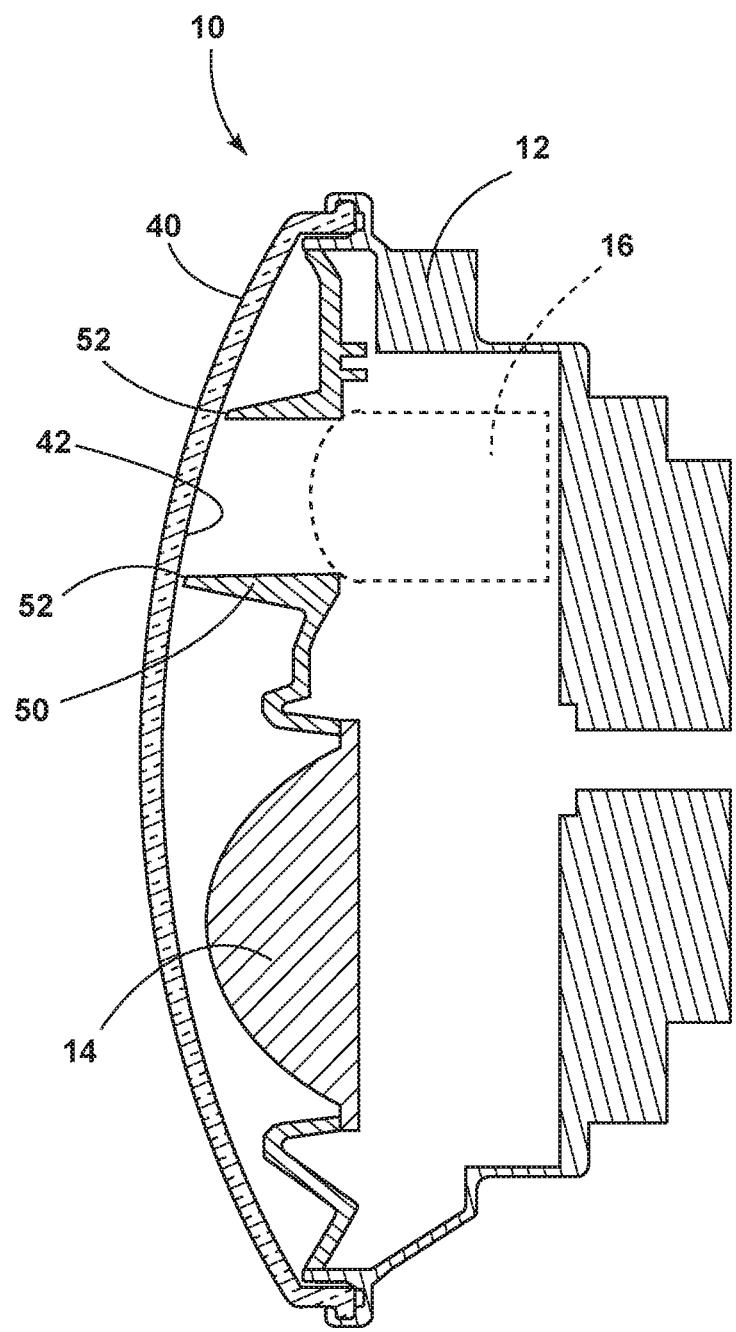
FIG. 5 is a side elevational cross-sectional view of the headlamp assembly of FIG. 4 with the headlamp lens installed.

In an alternate construction, as illustrated in FIGS. 4 and 5, a housing baffle 50 may be positioned forward of the image sensor 16. The housing baffle 50 is configured to receive light projected by light sources 18 from the headlights of an oncoming vehicle or taillights from a preceding vehicle. However, the housing baffle 50 is also configured to minimize or eliminate residual light projected by the headlamp 14, and which may be reflected back toward the image sensor 16 by the headlamp lens 40. Stated differently, this construction helps to focus or direct the image sensor 16 at image data exterior to the headlamp assembly 10. The housing baffle 50 includes a forward edge 52 that is chamfered to complement the inside surface 42 of the headlamp lens 40. The forward edge 52 of the housing baffle 50 may abut or may be positioned close to the housing baffle 50, as shown in FIG. 5.

Figure 6:
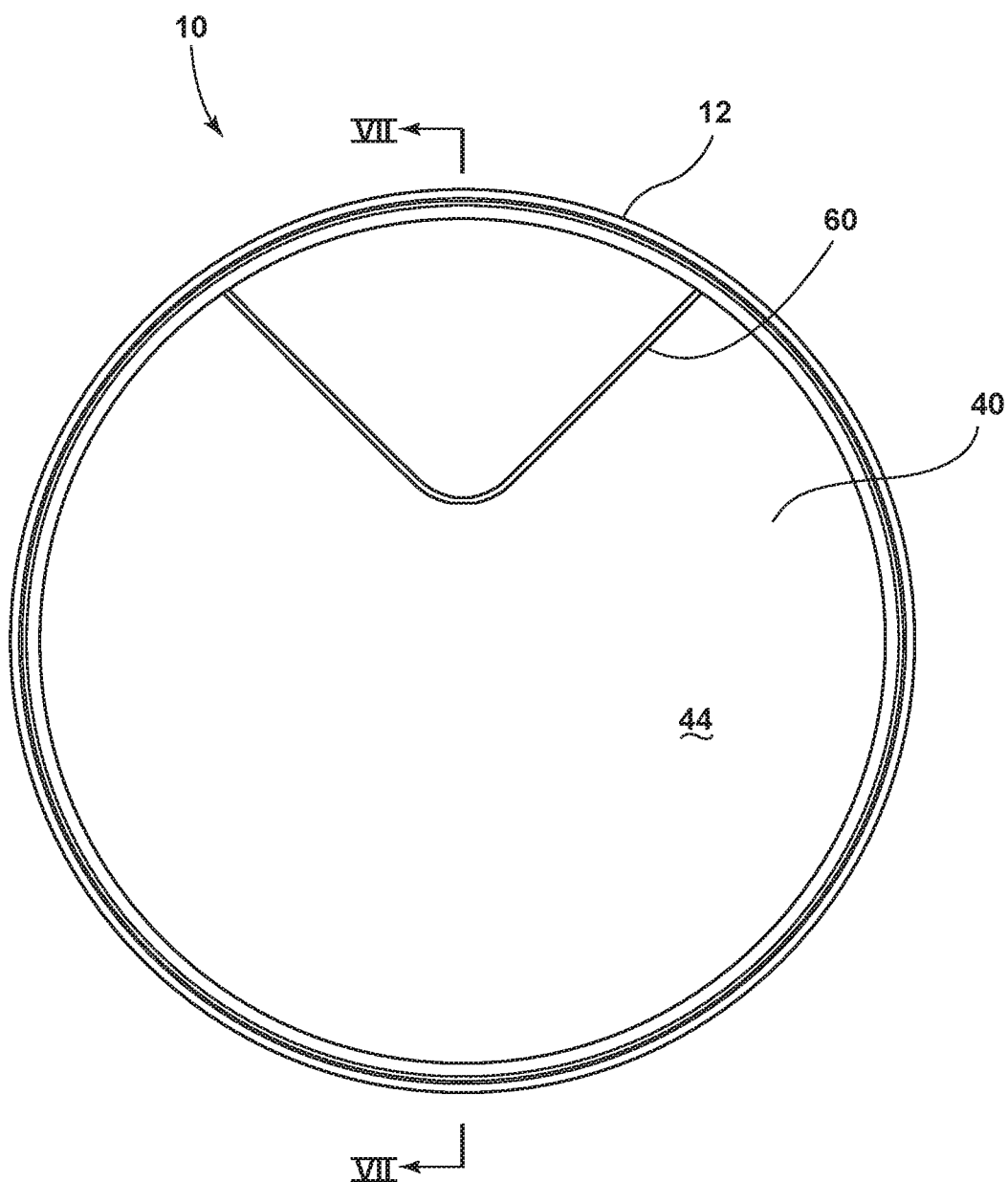
FIG. 6 is a front elevational view of a headlamp assembly of the present disclosure.
Figure 7:
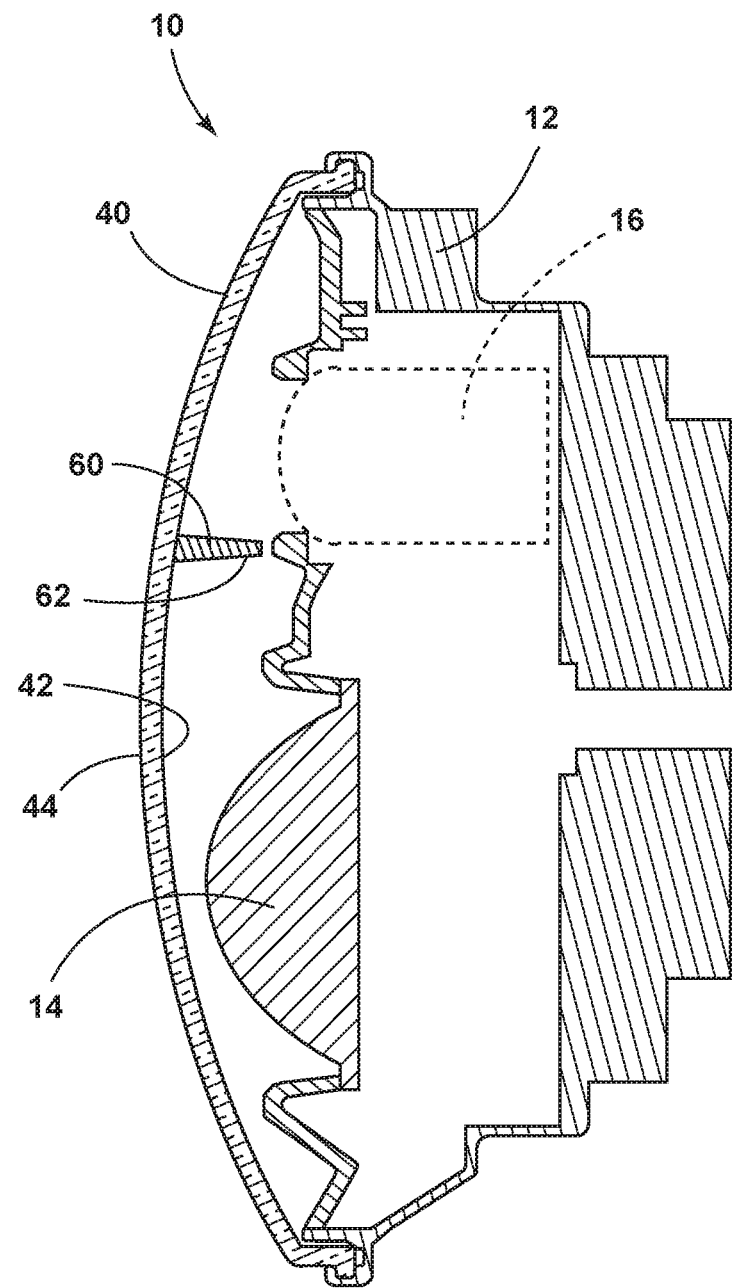
FIG. 7 is a side elevational cross-sectional view of the headlamp assembly of FIG. 6.

With reference now to FIGS. 6 and 7, in another construction, a lens baffle 60 may be provided that extends inwardly from the headlamp lens 40. In this instance, the headlamp lens 40 includes an interior wall 62 that defines the lens baffle 60, and which prohibits or minimizes light that is projected from the headlamp 14 from being reflected off the headlamp lens 40 toward the image sensor 16. The lens baffle 60 has a generally V-shaped front profile that extends rearwardly from the inside surface 42 of the headlamp lens 40. However, the lens baffle 60 may take on any shape that shields the image sensor 16 from the headlamp 14. Regardless of the shape, the lens baffle 60 extends from the headlamp lens 40 toward the image sensor 16 of the headlamp assembly 10 to isolate the image sensor 16. The lens baffle 60 may be formed from the same material of the headlamp lens 40 or a different material. Still further, the lens baffle 60 may be coated with an opaque, anti-reflective, or reflective coating to minimize unwanted light infiltration from the headlamp 14 to the image sensor 16. It is also contemplated that the lens baffle 60 may be attached to the inside surface 42 of the headlamp lens 40 or integrally formed therewith.

Figure 8:
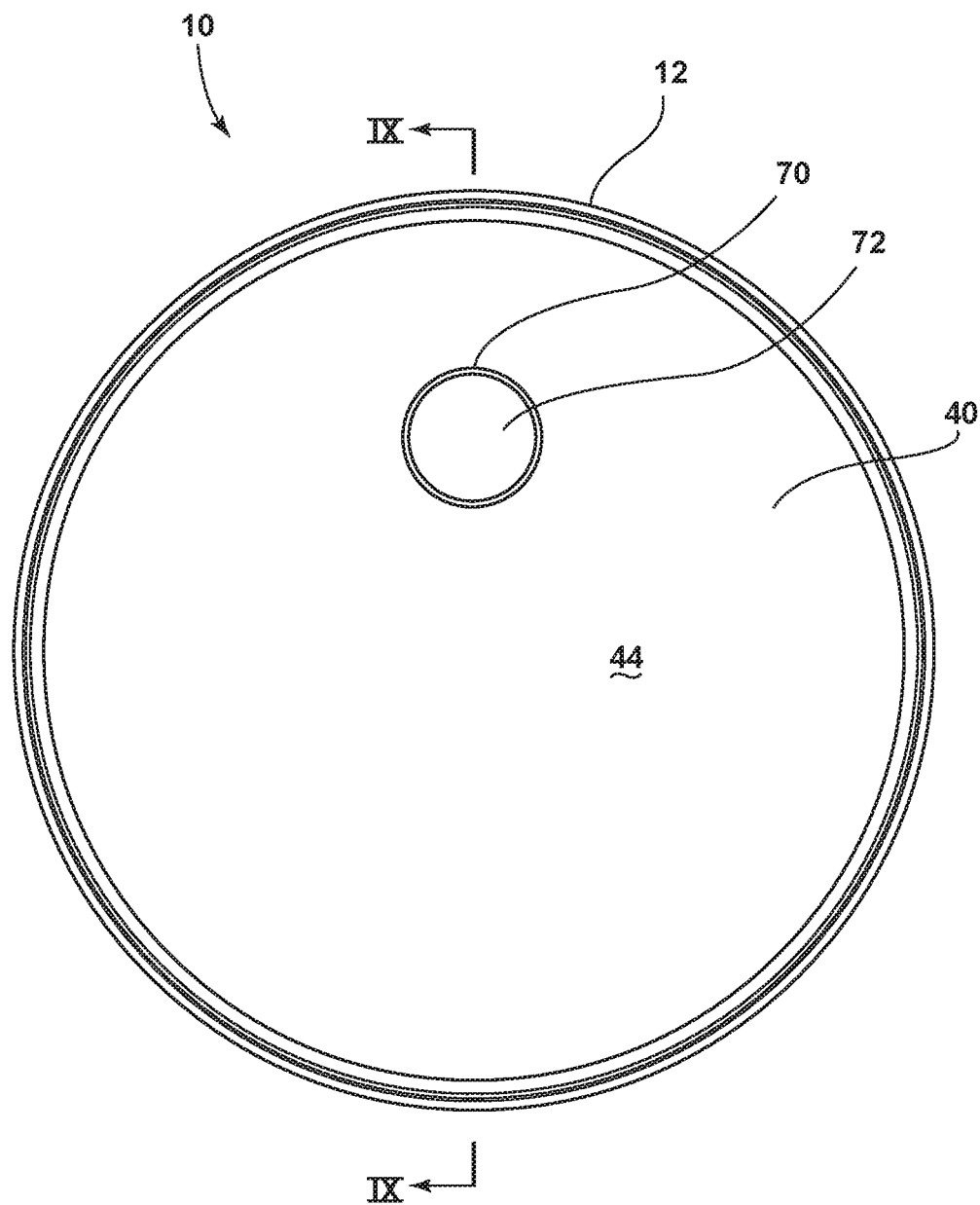
FIG. 8 is a front elevational view of a headlamp assembly of the present disclosure.
Figure 9:
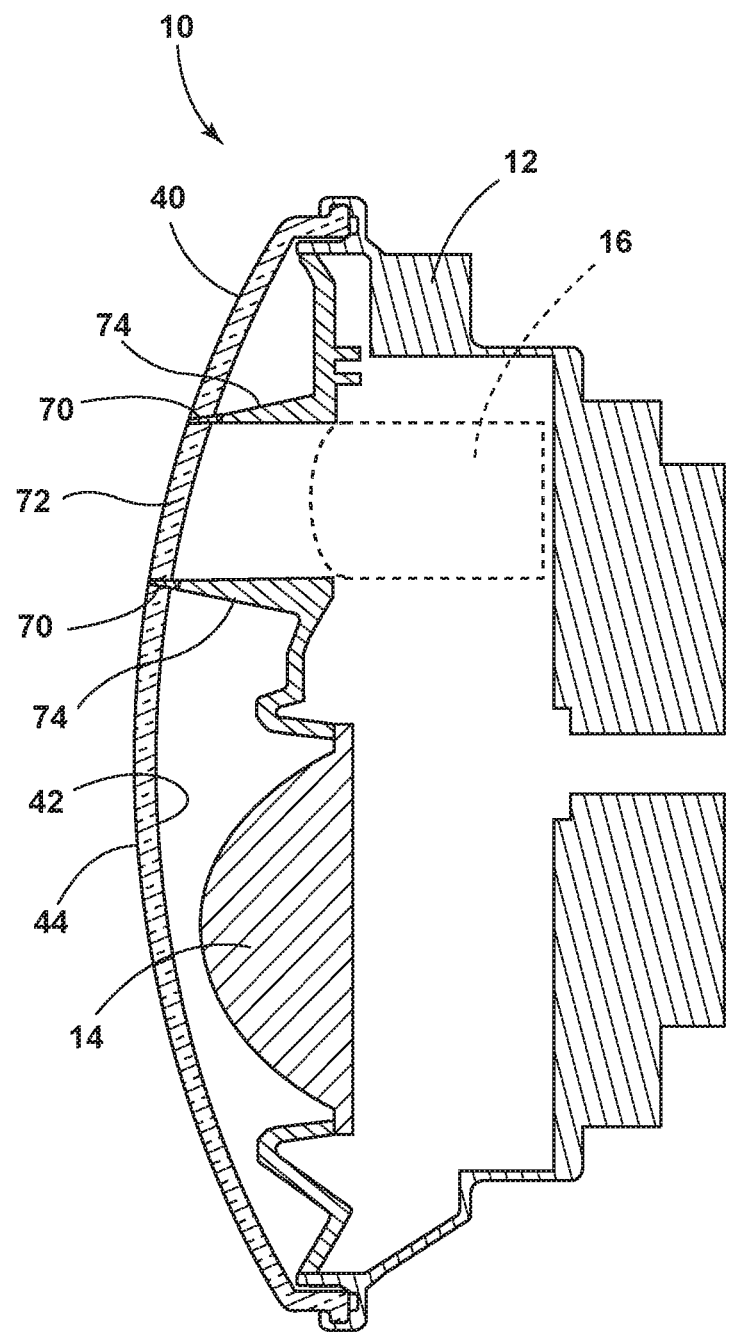
FIG. 9 is a side elevational cross-sectional view of the headlamp assembly of FIG. 8.

With reference now to FIGS. 8 and 9, in another construction of the headlamp assembly 10, a protrusion is provided in the headlamp 14 and forms a circular wall 70 that defines a lens island 72, which is provided in the headlamp lens 40, and which isolates the image sensor 16 from optical communication with the headlamp 14. In addition, a circular baffle 74 projects forward and contacts a rear surface of the circular wall 70 to define a lens shutoff that minimizes or prevents the image sensor 16 from capturing light emitted by the headlamp 14. The circular wall 70 may be integral with the baffle 74 such that a portion of the baffle 74 extends into or through the headlamp lens 40. The circular wall 70 may be constructed from an opaque material formed around or from the lens island 72, or may be a painted or coated material formed from the headlamp lens 40. Still further, the circular wall 70 could be injection molded into the headlamp lens 40 to minimize or eliminate reflective qualities of the headlamp lens 40 that could otherwise direct light from the headlamp 14 toward the image sensor 16.

Figure 10:
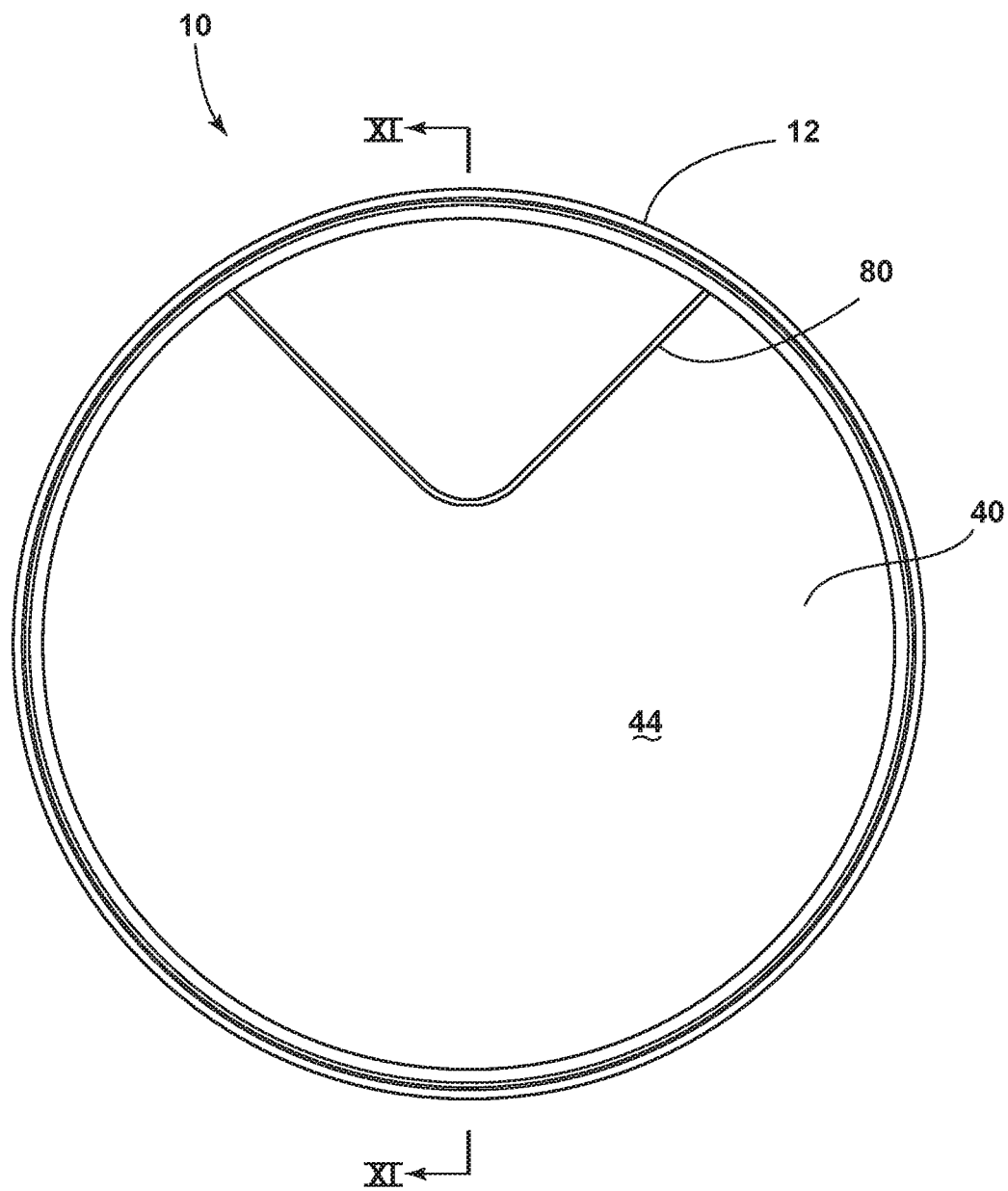
FIG. 10 is a front elevational view of a headlamp assembly of the present disclosure.
Figure 11:
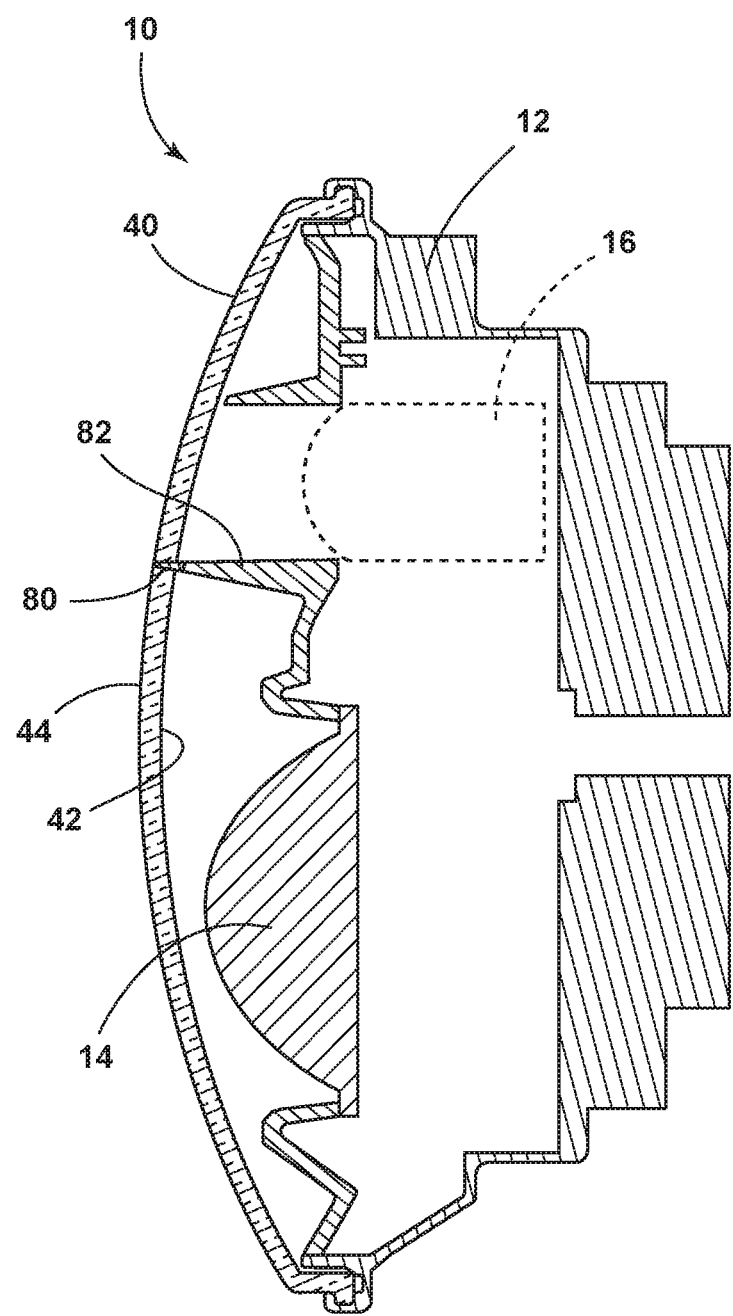
FIG. 11 is a side elevational cross-sectional view of the headlamp assembly of FIG. 10.

With reference now to FIGS. 10 and 11, in another instance, a V-shaped wall 80 extends into or is embedded in the headlamp lens 40 proximate the image sensor 16 to isolate the image sensor 16 from collecting reflected light projected from the headlamp 14 and also light which could reflect within the headlamp lens 40. It will be understood that the V-shaped wall 80 may be any shape. In addition, a housing baffle 82 projects forward toward the V-shaped wall 80 to define a lens shutoff that acts an isolation feature, minimizing the possibility of any reflection from the headlamp lens 40 in a direction toward the image sensor 16. The V-shaped wall 80 may be constructed from an opaque material. As a result, the image sensor 16 is free to receive image data from external light sources 18 forward of the headlamp assembly 10.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A vehicle system comprising:
   a housing disposed at a front portion of a vehicle and including a forward opening;
   a headlamp disposed within the housing;
   a headlamp lens extending over the forward opening;
   an image sensor disposed within the housing and configured to detect a light source;
   an ambient light sensor;
   a controller operably coupled to the image sensor, the ambient light sensor, and the headlamp, the controller operable to control the headlamp in response to the light source detected by the image sensor; and
   a baffle proximate the image sensor, the baffle configured to isolate the image sensor from light emitted by the headlamp, wherein at least a portion of the baffle extends into the headlamp lens.

2. The vehicle system of claim 1, wherein the baffle extends from the housing forward toward the headlamp lens of the housing.

3. The vehicle system of claim 1, wherein the baffle extends from the headlamp lens rearward to the housing.

4. The vehicle system of claim 1, wherein the baffle includes a protrusion that is internal to the headlamp lens.

5. The vehicle system of claim 1, wherein the baffle extends circumferentially about an imager lens of the imager sensor.

6. The vehicle system of claim 1, wherein the baffle includes a coating on an inside surface of the baffle to minimize light infiltration from the headlamp to the imager sensor.

7. The vehicle system of claim 1, wherein the baffle is formed from a material that is the same as the headlamp lens.

8. The vehicle system of claim 1, wherein a forward portion of the baffle extends through the headlamp lens.

9. The vehicle system of claim 1, wherein the baffle includes a generally V-shaped wall that isolates the image sensor from the light emitted by the headlamp.

10. A headlamp assembly comprising:
    a housing;
    a headlamp disposed within the housing;
    an image sensor disposed within the housing and configured to detect a light source;
    a headlamp lens including a circular wall therein that defines a lens island;
    a baffle proximate the image sensor and aligned with the circular wall; and
    a controller operably coupled to the image sensor and the headlamp, the controller operable to control the headlamp in response to the light source detected by the image sensor.

11. The headlamp assembly of claim 10,
    wherein the baffle is configured to isolate the image sensor from light emitted by the headlamp.

12. The headlamp assembly of claim 10, wherein the image sensor is configured to receive image data through the lens island of said headlamp assembly.

13. The headlamp assembly of claim 10, wherein the baffle extends from the housing forward toward the headlamp lens.

14. The headlamp assembly of claim 10, wherein a gap is defined between the baffle and an inside surface of a headlamp lens.

15. The headlamp assembly of claim 10, further comprising:
   an ambient light sensor, wherein the controller is operably coupled to the ambient light sensor, and wherein the controller is operable to control the headlamp in response to the light source detected by the image sensor.

16. The headlamp assembly of claim 15, wherein the controller utilizes an algorithm that functions to discern between the headlamp and one of headlights of an oncoming vehicle and taillights of a preceding vehicle.

* * * * *